United States Patent
Lee et al.

(10) Patent No.: US 10,972,990 B2
(45) Date of Patent: Apr. 6, 2021

(54) SYSTEM INFORMATION RATE MATCHING

(71) Applicant: QUALCOMM Incorporated, San Diego, CA (US)

(72) Inventors: Heechoon Lee, San Diego, CA (US); Tao Luo, San Diego, CA (US); Hung Dinh Ly, San Diego, CA (US); Muhammad Nazmul Islam, Edison, NJ (US); Yang Yang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 217 days.

(21) Appl. No.: 16/124,501

(22) Filed: Sep. 7, 2018

(65) Prior Publication Data

US 2019/0082403 A1 Mar. 14, 2019

Related U.S. Application Data

(60) Provisional application No. 62/556,816, filed on Sep. 11, 2017.

(51) Int. Cl.
*H04W 56/00* (2009.01)
*H04W 72/04* (2009.01)
(Continued)

(52) U.S. Cl.
CPC ......... *H04W 56/001* (2013.01); *H04L 1/0045* (2013.01); *H04L 7/00* (2013.01);
(Continued)

(58) Field of Classification Search
None
See application file for complete search history.

(56) References Cited

U.S. PATENT DOCUMENTS

2018/0278389 A1* 9/2018 Hamelin ............... H04L 1/0041
2018/0324678 A1* 11/2018 Chen ...................... H04W 8/08
(Continued)

OTHER PUBLICATIONS

Asustek: "Information carried on Synchronization Signal and Broadcast Channel", 3GPP Draft; R1-160119 Information carried on Synchronization Signal and Broadcast Channel, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 18, 2016-Jan. 20, 2016 Jan. 17, 2016, XP051053439, Retrieved from the Internet: URL:http://www.3gpp.org/ftp/Meetings_3GPP_SYNC/RAN1/Docs/ [retrieved on Jan. 17, 2016], 3 pages.

(Continued)

*Primary Examiner* — Scott M Sciacca
(74) *Attorney, Agent, or Firm* — Harrity & Harrity, LLP

(57) ABSTRACT

Certain aspects of the present disclosure generally relate to wireless communication. In some aspects, a user equipment may receive a communication that includes system information, wherein the system information includes information associated with identifying a set of resources that carry synchronization communications, wherein the set of resources is included in a set of potential resources on which synchronization communications can be carried; and perform, based at least in part on a rate matching rule, de-rate matching associated with receiving the system information, wherein the rate matching rule is a rule associated with performing de-rate matching with respect to the set of potential resources. Numerous other aspects are provided.

30 Claims, 13 Drawing Sheets

(51) Int. Cl.
- *H04L 7/00* (2006.01)
- *H04W 48/16* (2009.01)
- *H04L 1/00* (2006.01)
- *H04W 68/02* (2009.01)
- *H04W 74/08* (2009.01)
- *H04L 5/00* (2006.01)
- *H04W 88/02* (2009.01)

(52) U.S. Cl.
 CPC ........... *H04W 48/16* (2013.01); *H04W 68/02* (2013.01); *H04W 72/042* (2013.01); *H04W 74/0833* (2013.01); *H04L 1/0067* (2013.01); *H04L 5/005* (2013.01); *H04L 5/0053* (2013.01); *H04L 5/0094* (2013.01); *H04W 88/02* (2013.01)

(56) References Cited

U.S. PATENT DOCUMENTS

| | | | |
|---|---|---|---|
| 2019/0068348 A1* | 2/2019 | Nam | H04L 5/0053 |
| 2019/0230696 A1* | 7/2019 | Kim | H04L 5/0053 |
| 2019/0363824 A1* | 11/2019 | Sun | H04L 5/0053 |

OTHER PUBLICATIONS

Interdigital Inc: "On Remaining Issues of Synchronization Signal", 3GPP Draft; R1-1718472, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017, XP051341654, Retrieved from the Internet: URL:http://www.3gpp.org/ftp/Meetings_3GPP_SYNC/RAN1/Docs/ [retrieved on Oct. 8, 2017], 5 pages.

International Search Report and Written Opinion—PCT/US2018/050275—ISA/EPO—dated Dec. 20, 2018.

NTT Docomo et al., "Further Views on Wider Bandwidth Operations for NR", 3GPP Draft; R1-1708494 Wider BW for NR, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017, XP051273686, Retrieved from the Internet: URL:http://www.3gpp.org/ftp/Meetings_3GPP_SYNC/RAN1/Docs/ [retrieved on May 14, 2017], 6 pages.

* cited by examiner

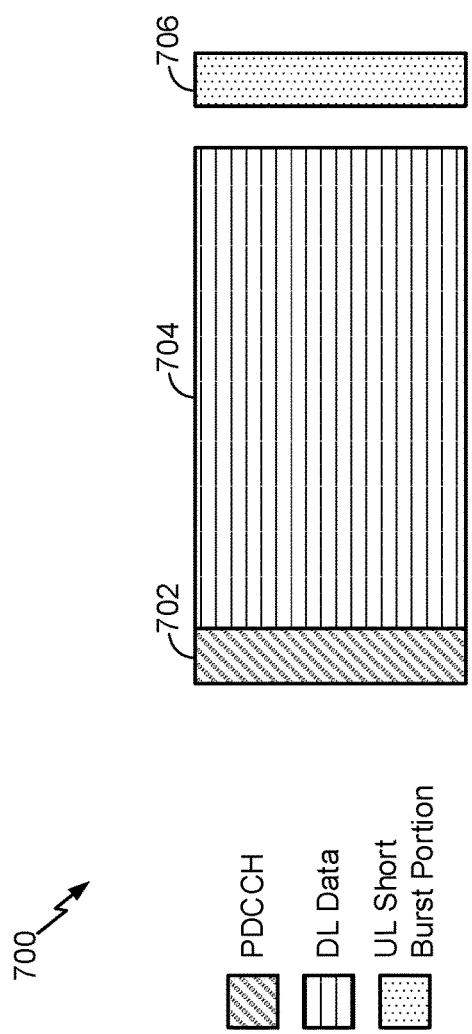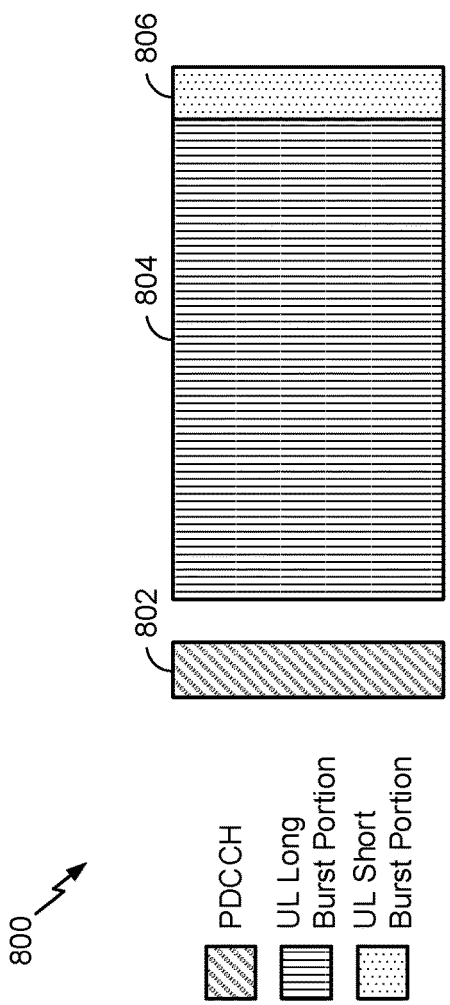
FIG. 7
FIG. 8

SYSTEM INFORMATION RATE MATCHING

CROSS REFERENCE TO RELATED APPLICATIONS UNDER 35 U.S.C. § 119

This application claims priority to U.S. Provisional Patent Application No. 62/556,816 filed on Sep. 11, 2017 entitled "TECHNIQUES AND APPARATUSES FOR REMAINING MINIMUM SYSTEM INFORMATION RATE MATCHING," which is incorporated by reference herein.

FIELD OF THE DISCLOSURE

Aspects of the present disclosure generally relate to wireless communication, and more particularly to techniques and apparatuses for system information (e.g., remaining minimum system information (RMSI), system information block 1 (SIB1), minimum system information (MSI), and/or the like) rate matching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include receiving, by a UE, a communication that includes system information, wherein the system information includes information associated with identifying a set of resources that carry synchronization communications, wherein the set of resources is included in a set of potential resources on which the synchronization communications can be carried; and performing, by the UE and based at least in part on a rate matching rule, de-rate matching associated with receiving the system information, wherein the rate matching rule is a rule associated with performing de-rate matching with respect to the set of potential resources.

In some aspects, a user equipment for wireless communication may include memory and one or more processors operatively coupled to the memory. The memory and the one or more processors may be configured to receive a communication that includes system information, wherein the system information includes information associated with identifying a set of resources that carry synchronization communications, wherein the set of resources is included in a set of potential resources on which synchronization communications can be carried; and perform, based at least in part on a rate matching rule, de-rate matching associated with receiving the system information, wherein the rate matching rule is a rule associated with performing de-rate matching with respect to the set of potential resources.

In some aspects, a non-transitory computer-readable medium may store one or more instructions for wireless communication. The one or more instructions, when executed by one or more processors of a UE, may cause the one or more processors to receive a communication that includes system information, wherein the system information includes information associated with identifying a set of resources that carry synchronization communications, wherein the set of resources is included in a set of potential resources on which synchronization communications can be carried; and perform, based at least in part on a rate matching rule, de-rate matching associated with receiving the system information, wherein the rate matching rule is a rule associated with performing de-rate matching with respect to the set of potential resources.

In some aspects, an apparatus for wireless communication may include means for receiving a communication that includes system information, wherein the system information includes information associated with identifying a set of resources that carry synchronization communications, wherein the set of resources is included in a set of potential resources on which synchronization communications can be carried; and means for performing, based at least in part on a rate matching rule, de-rate matching associated with receiving the system information, wherein the rate matching rule is a rule associated with performing de-rate matching with respect to the set of potential resources.

In some aspects, a method for wireless communication may include performing, by a UE, rate matching in association with a communication, wherein the rate matching is performed based at least in part on a rate matching rule associated with a set of potential resources on which synchronization communications can be carried; and transmitting, by the UE, the communication based at least in part on performing the rate matching.

In some aspects, a UE for wireless communication may include memory and one or more processors operatively coupled to the memory. The memory and the one or more processors may be configured to perform rate matching in association with a communication, wherein the rate matching is performed based at least in part on a rate matching rule associated with a set of potential resources on which synchronization communications can be carried; and transmit the communication based at least in part on performing the rate matching.

In some aspects, a non-transitory computer-readable medium may store one or more instructions for wireless communication. The one or more instructions, when executed by one or more processors of a UE, may cause the one or more processors to perform rate matching in association with a communication, wherein the rate matching is performed based at least in part on a rate matching rule associated with a set of potential resources on which synchronization communications can be carried; and transmit the communication based at least in part on performing the rate matching.

In some aspects, an apparatus for wireless communication may include means for performing rate matching in association with a communication, wherein the rate matching is performed based at least in part on a rate matching rule associated with a set of potential resources on which synchronization communications can be carried; and means for transmitting the communication based at least in part on performing the rate matching.

In some aspects, a method for wireless communication may include transmitting, by a base station, at least one synchronization communication, wherein the at least on synchronization communication is transmitted in a set of resources, wherein the set of resources is included in a set of potential resources on which synchronization communications can be carried; and transmitting, by the base station, a communication including system information, wherein the system information includes information associated with identifying the set of resources, and wherein the communication is transmitted in resources other than the set of resources.

In some aspects, a base station for wireless communication may include memory and one or more processors operatively coupled to the memory. The memory and the one or more processors may be configured to transmit at least one synchronization communication, wherein the at least on synchronization communication is transmitted in a set of resources, wherein the set of resources is included in a set of potential resources on which synchronization communications can be carried; and transmit a communication including system information, wherein the system information includes information associated with identifying the set of resources, and wherein the communication is transmitted in resources other than the set of resources.

In some aspects, a non-transitory computer-readable medium may store one or more instructions for wireless communication. The one or more instructions, when executed by one or more processors of a UE, may cause the one or more processors to transmit at least one synchronization communication, wherein the at least on synchronization communication is transmitted in a set of resources, wherein the set of resources is included in a set of potential resources on which synchronization communications can be carried; and transmit a communication including system information, wherein the system information includes information associated with identifying the set of resources, and wherein the communication is transmitted in resources other than the set of resources.

In some aspects, an apparatus for wireless communication may include means for transmitting at least one synchronization communication, wherein the at least on synchronization communication is transmitted in a set of resources, wherein the set of resources is included in a set of potential resources on which synchronization communications can be carried; and means for transmitting a communication including system information, wherein the system information includes information associated with identifying the set of resources, and wherein the communication is transmitted in resources other than the set of resources.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with certain aspects of the present disclosure.

FIG. 8 is a diagram illustrating an example of an uplink (UL)-centric subframe, in accordance with certain aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
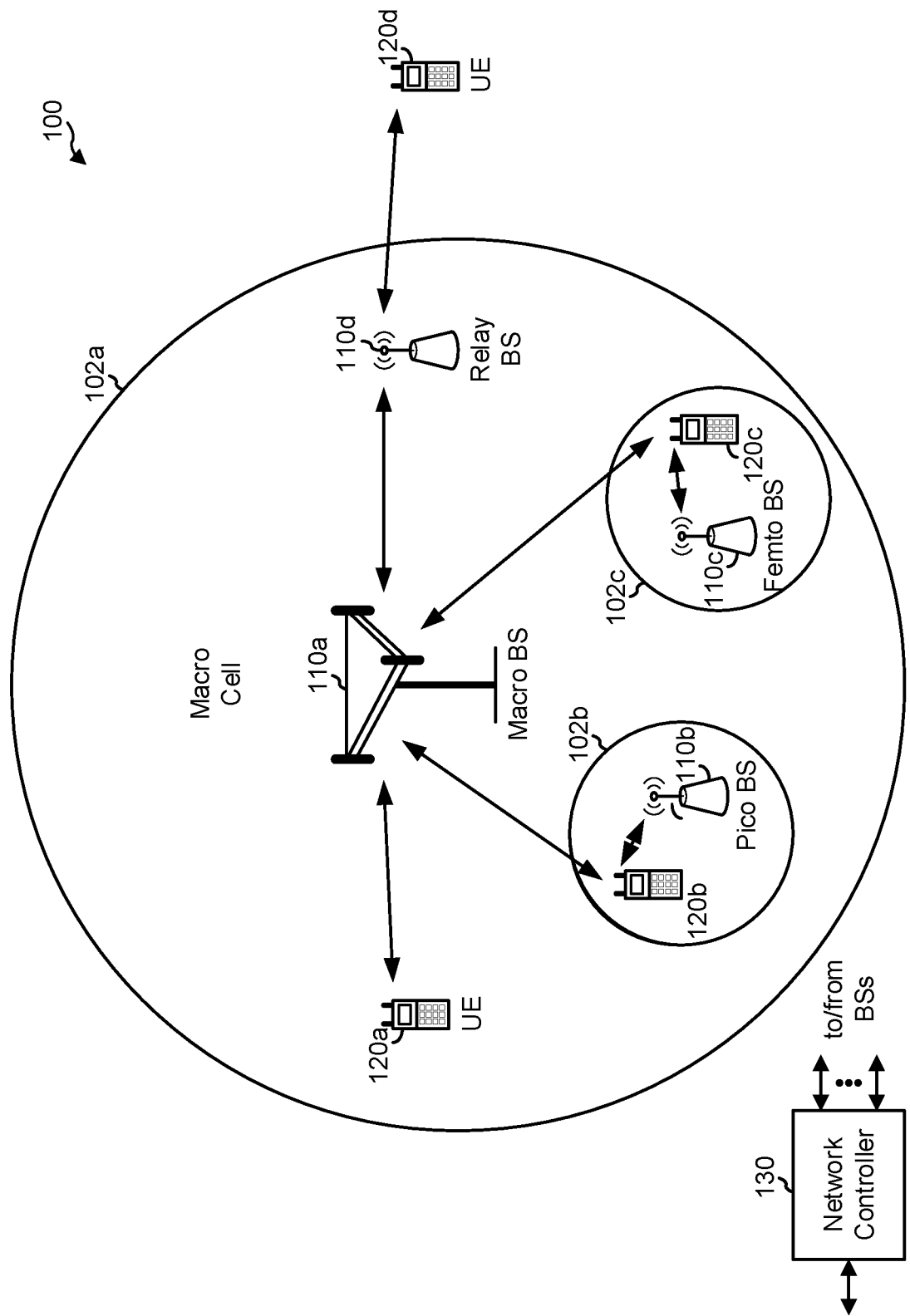
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
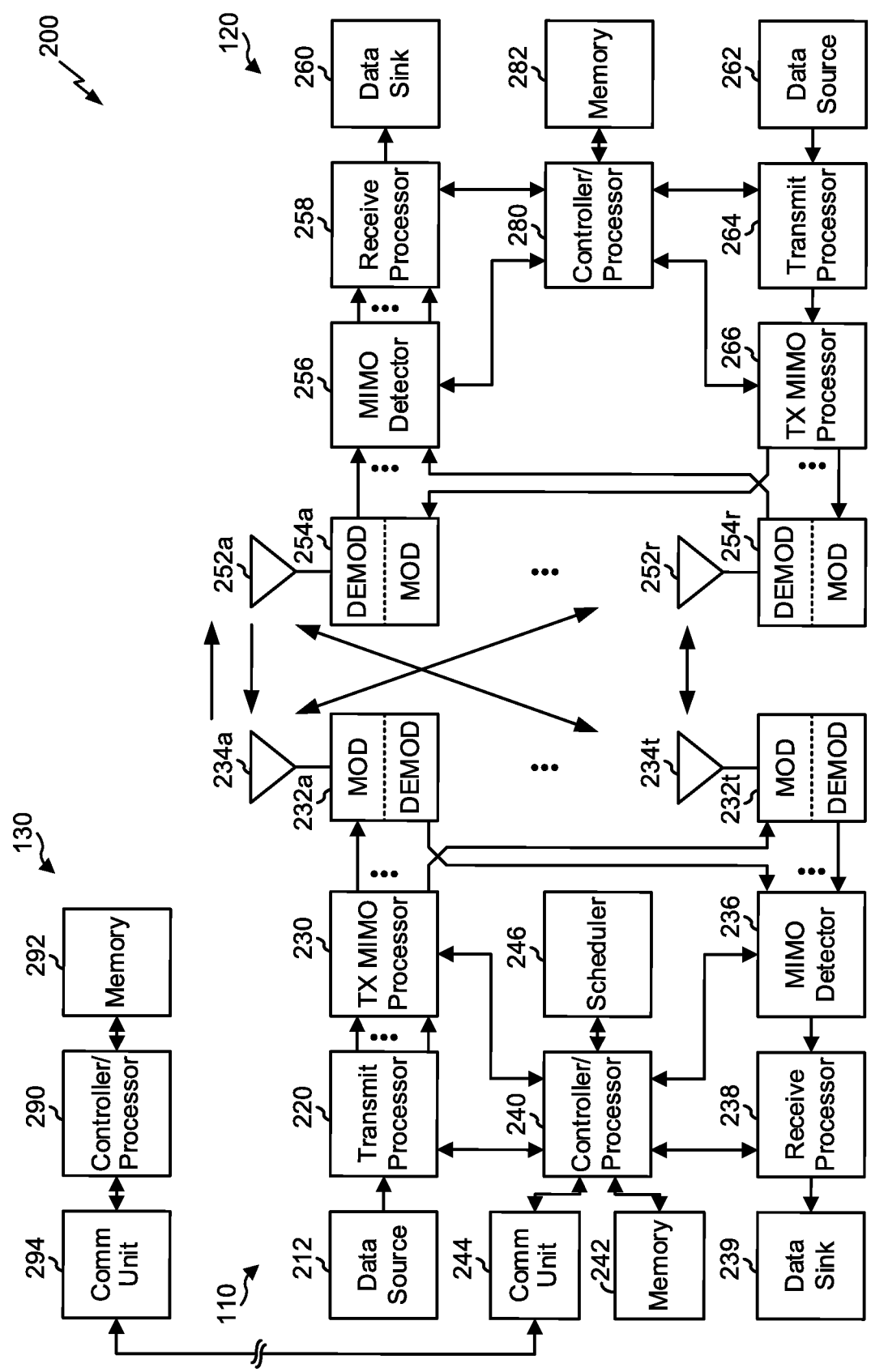
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform operations related to de-rate matching or rate matching, associated with communication, based at least in part on a rate matching rule. For example, controller/processor 280 and/or other processors and modules at UE 120, may perform or direct operations of UE 120 to perform de-rate matching or rate matching, associated with communication, based at least in part on a rate matching rule. For example, controller/processor 280 and/or other controllers/processors and modules at UE 120 may perform or direct operations of, for example, process 1100 of FIG. 11, process 1200 of FIG. 12, and/or other processes as described herein. As another example, controller/processor 240 and/or other controllers/processors and modules at base station 110 may perform or direct operations of, for example, process 1300 of FIG. 13 and/or other processes as described herein. In some aspects, one or more of the components shown in FIG. 2 may be employed to perform example process 1100, example process 1200, example process 1300, and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving a communication that includes system information, wherein the system information includes information associated with identifying a set of resources that carry synchronization communications, wherein the set of resources is included in a set of potential resources on which synchronization communications can be carried, means for performing, based at least in part on a rate matching rule, de-rate matching associated with receiving the system information, wherein the rate matching rule is a rule associated with performing de-rate matching with respect to the set of potential resources, and/or the like. In some aspects, such means may include one or more components of UE 120 described in connection with FIG. 2.

In some aspects, UE 120 may include means for performing rate matching in association with a communication, wherein the rate matching is performed based at least in part on a rate matching rule associated with a set of potential resources on which synchronization communications can be carried; and means for transmitting the communication based at least in part on performing the rate matching, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
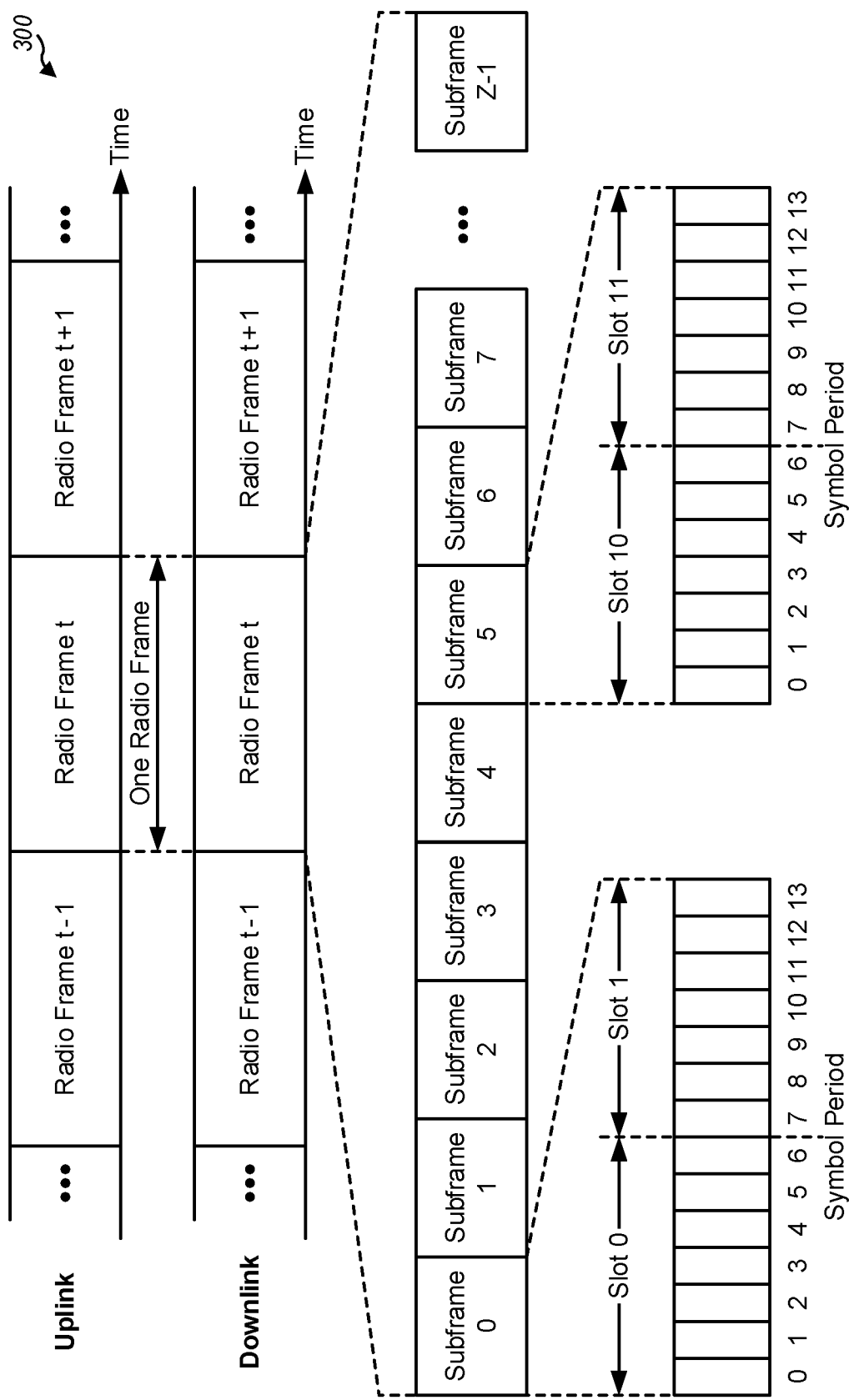
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a BS may transmit synchronization signals. For example, a BS may transmit a primary synchronization signal (PSS), a secondary synchronization signal (SSS), a tertiary synchronization signal (TSS), and/or the like, on the downlink for each cell supported by the BS. The PSS and SSS may be used by UEs for cell search and acquisition. For example, the PSS may be used by UEs to determine symbol timing, and the SSS may be used by UEs to determine a physical cell identifier, associated with the BS, and frame timing. The BS may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
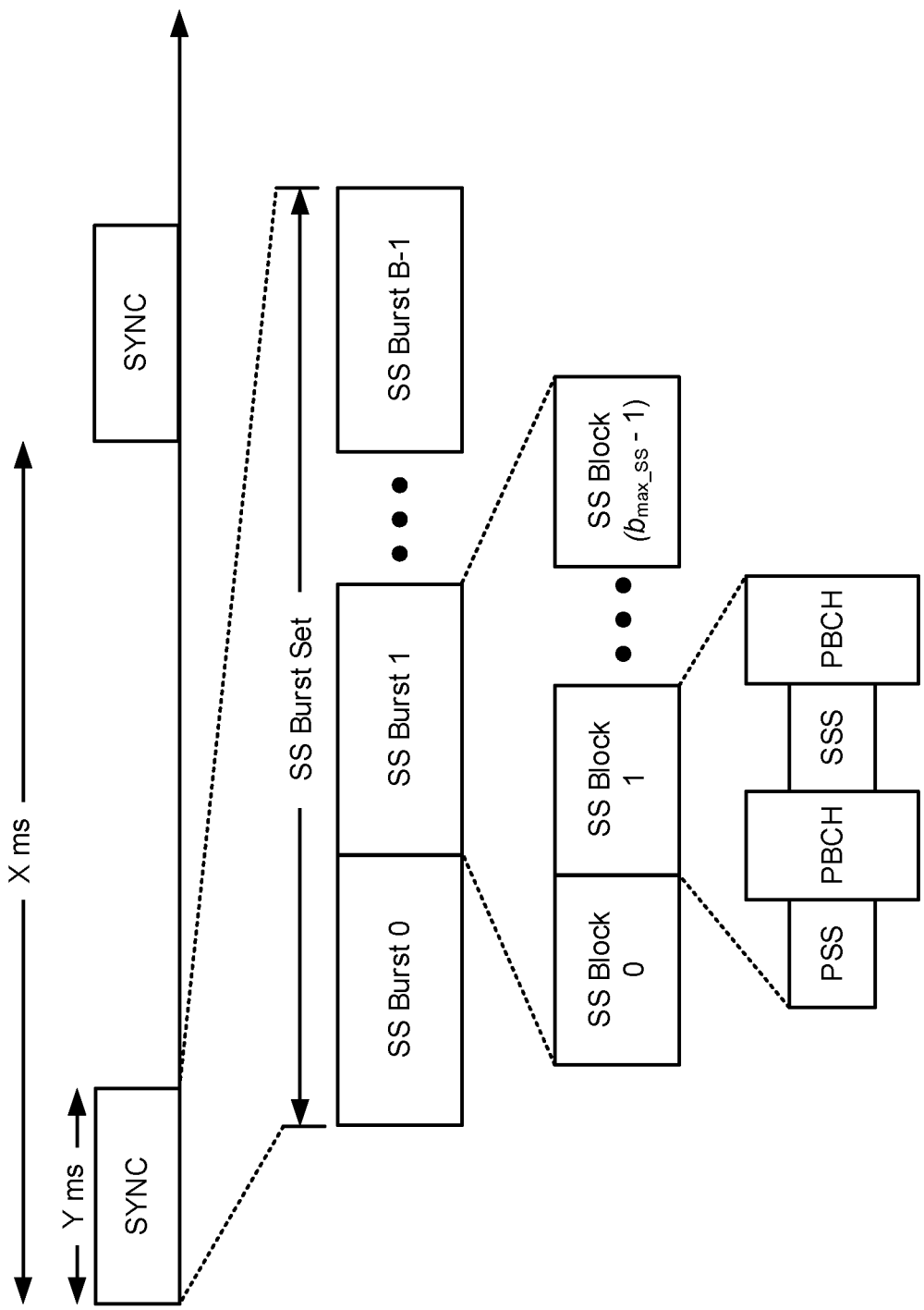
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a TSS) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst. In some aspects, the SS burst set may have a burst set periodicity, whereby the SS bursts of the SS burst set are transmitted by the BS according to the fixed burst set periodicity. In other words, the SS bursts may be repeated during each SS burst set.

The BS may transmit system information, such as a master information block (MIB), a system information block (SIB) (e.g., SIB1), remaining minimum system information (RMSI), minimum system information (MSI), and/or the like, on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
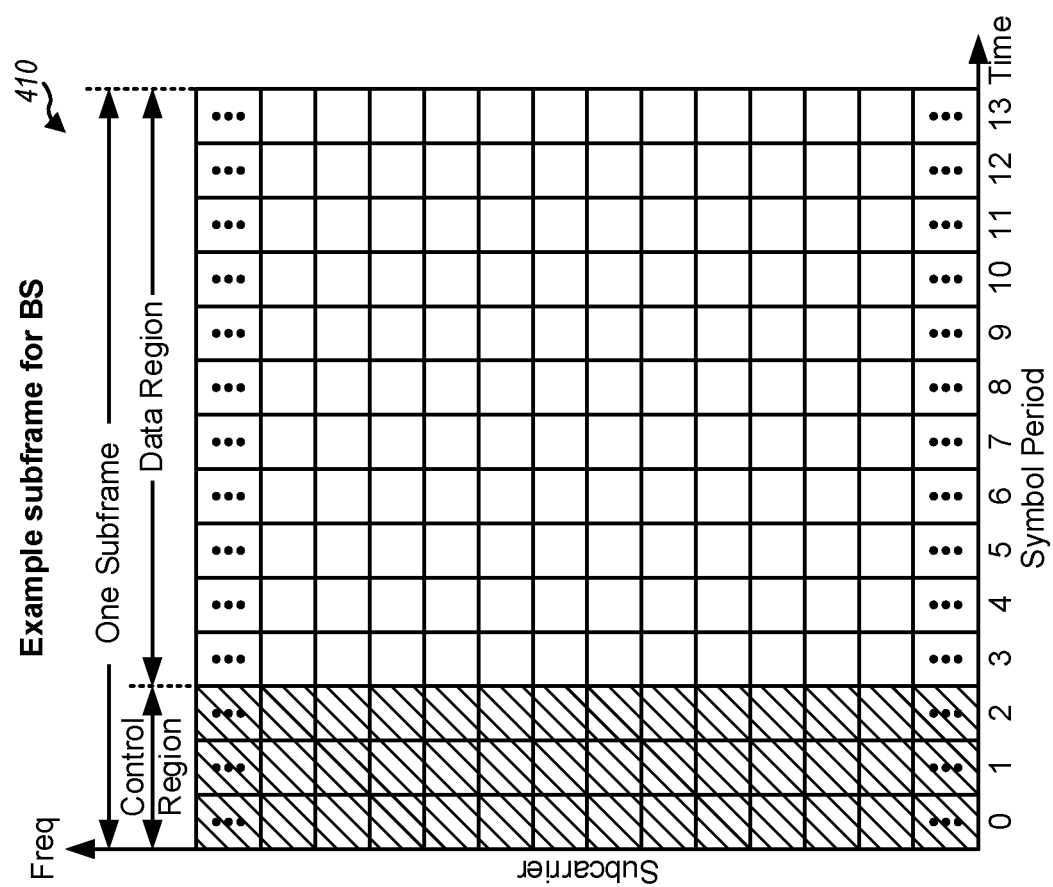
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each 176420 resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of PDCCH communications, PDSCH communications, blocks (e.g., blocks that carry the PSS, the SSS, the PBCH, etc.) and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 kilohertz (kHz), 120 kHz, and/or the like, over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data. In some aspects, additional and/or different carrier bandwidths, sub-carrier bandwidths, radio frame formats, subframe formats, and/or the like, may be supported.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
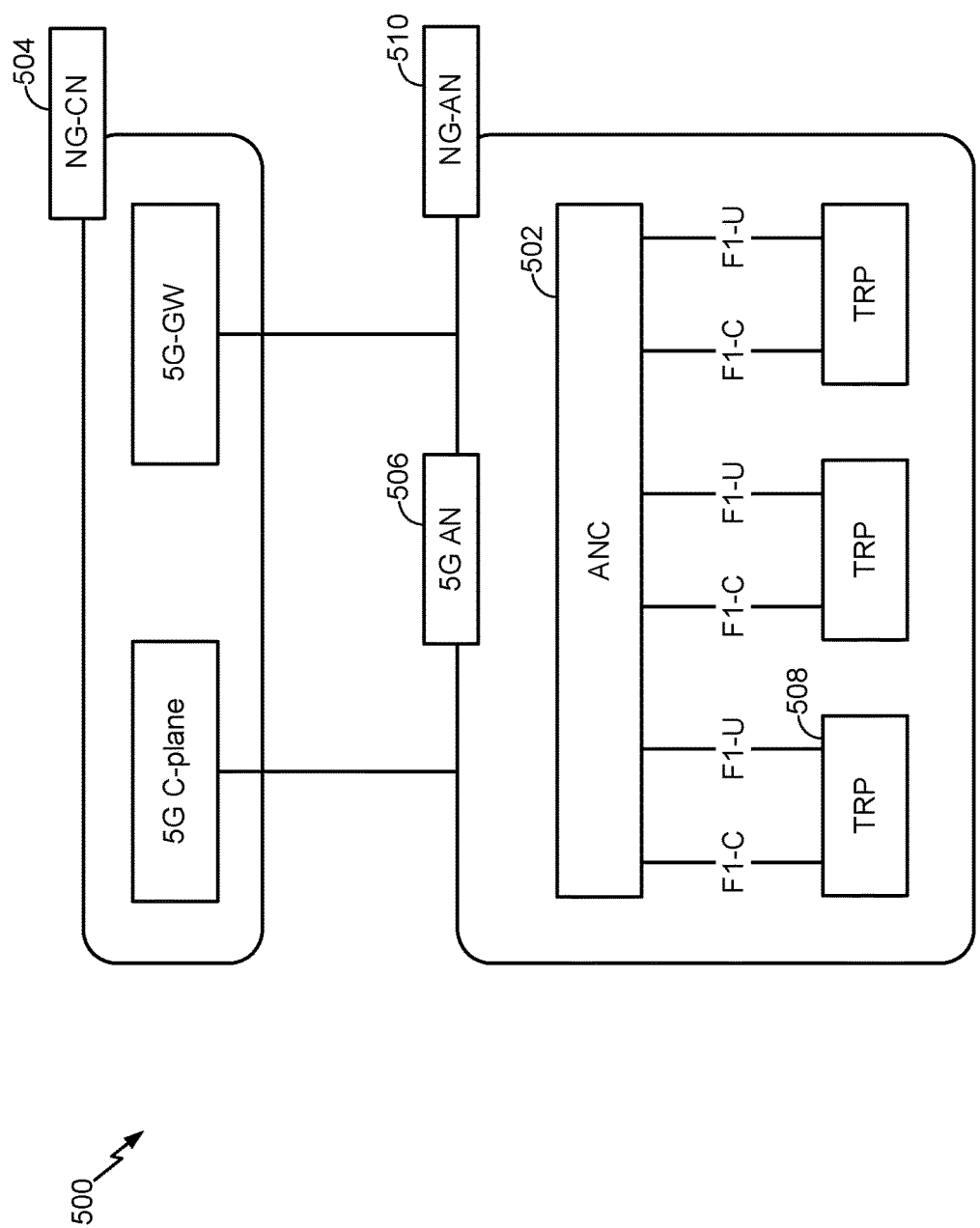
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
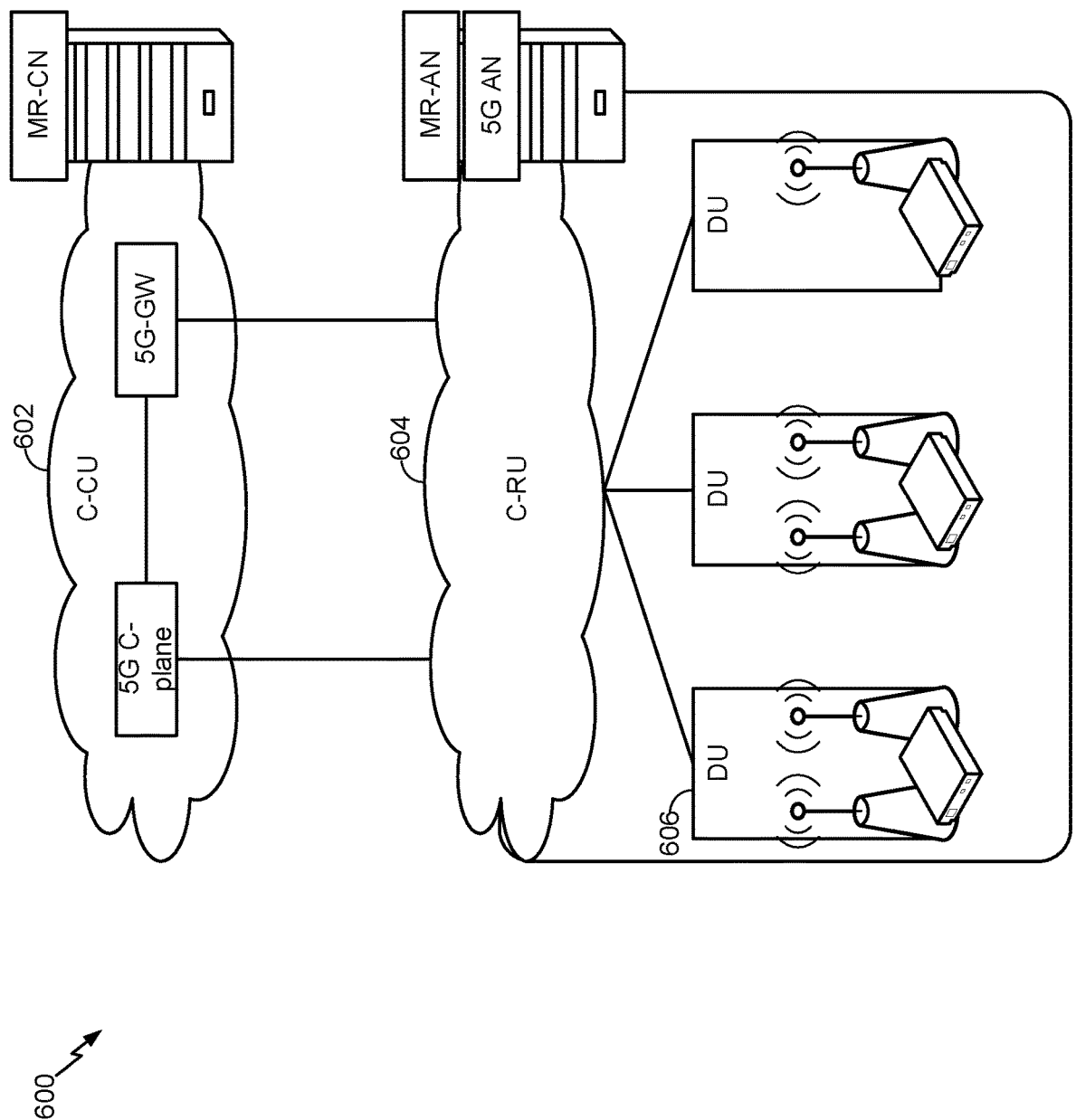
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

As described above, a base station may transmit a synchronization communication (e.g., a SS block including a PBCH, a PSS, a SSS, and/or the like) for reception by UEs (e.g., such that the UEs can access a wireless network via the base station). In some cases, the number of synchronization communications in a given burst set may depend on a carrier frequency associated with the synchronization communications.

For example, in a case where path loss associated with the carrier frequency is relatively low (e.g., when the carrier frequency is at or below approximately 6 gigahertz (GHz)), the SS burst set may include 4 synchronization communications, 8 synchronization communications, and/or the like. Here, the synchronization communications may be received by UEs at comparatively different directions from the base station since, for example, path loss may be relatively low at such carrier frequencies. Thus, in such a case, the base station can transmit a relatively small number of synchronization communications without impacting access to the wireless network (e.g., since UEs at comparatively different directions from the base station may still receive the synchronization communications).

As another example, in a case where path loss associated with the carrier frequency is relatively high (e.g., when the carrier frequency is above approximately 6 GHz), the SS burst set may include a comparatively larger number of synchronization communications. As a particular example, when the carrier frequency is a millimeter wave (mmW) carrier frequency, the base station may transmit up to 64 synchronization communications. Here, the transmission of the comparatively large number of synchronization communications facilitates implementation of techniques associated with minimizing path loss and/or improving network efficiency for communications at the mmW frequency. Such techniques may include beamforming (e.g., transmitting a beam in a particular direction), beam sweeping (e.g., transmitted differently formed beams in different directions at different times), and/or the like.

In some cases, the base station determines the number of synchronization communications to be transmitted by the base station. For example, the base station may store information that identifies a set of potential resources (e.g., a particular subframe of a given frame, a particular slot of a given subframe, a particular resource block of a given slot, a particular resource element of a given resource block, and/or the like) in which the base station is permitted to transmit synchronization communications for a given carrier frequency. Here, the base station may determine a number of synchronization communications to be transmitted by the base station, and may select and/or identify a set of resources of the set of potential resources (e.g., 4 of the 64 potential resources, 16 of the 64 potential resources, 40 of the 64 potential resources, all 64 of the potential resources, and/or the like) to use for the transmission of synchronization communications. Thus, a number of synchronization communications transmitted by the base station in one burst set may be different from a number of synchronization communications transmitted by the base station in another burst set, as determined by the base station.

In some cases, the base station may transmit information that allows a UE to identify the set of resources, of the set of potential resources, selected by the base station to carry the synchronization communications. For example, the base station may transmit system information (e.g., RMSI, SIB1, MSI, and/or the like) that includes information that allows the UE to identify the set of resources, such as information that identifies a pattern of the set of resources within the set of potential resources (sometimes referred to as a "mask"). As a particular example, the RMSI may indicate whether a first set of resources of the set of potential resources (e.g., even numbered resources, a first half of the resources, and/or the like) carry synchronization communications, whether a second set of resources of the set of potential resources (e.g., odd numbered resources, a second half of the resources, and/or the like) carry synchronization communications, and/or the like. In other words, the RMSI may include information that allows the UE to identify the set of resources (e.g., as compared to full information that indicates whether each individual resource is carrying a synchronization communication).

The set of resources may be associated with multiple transmissions of synchronization communications (e.g., such that the UE may identify a set of resources, associated with a given downlink communication, based at least in part on RMSI received in an earlier communication). In some cases, the RMSI is included in a PDSCH communication transmitted by the base station. Further, in some cases, the base station may provide full information, associated with the set of resources, via a UE-specific RRC signal (e.g., after a UE accesses the network via the base station).

However, in a case where the base station is permitted to transmit a comparatively large number of synchronization communications, some of the synchronization communications may be transmitted in resources that may otherwise be used for another communication. For example, for a mmW carrier frequency case in which the base station may transmit up to 64 synchronization communications, one or more of the synchronization communications may be transmitted in resources that would otherwise be used for a PDCCH communication, a PDSCH communication, and/or the like. In other words, the one or more synchronization communications may collide with the PDCCH communication and/or the PDSCH communication.

In this example, the system information (e.g., the RMSI) that allows a UE to identify the set of resources is included in the PDSCH communication, but the UE may not readily determine the system information without knowledge of the set of resources (e.g., since the collision of the synchronization communications with PDSCH resources may prevent the UE from correctly determining the system information).

Some aspects described herein provide techniques and apparatuses for performing de-rate matching or rate matching, associated with a communication, based at least in part on a rate matching rule associated with a set of potential resources that may carry synchronization communications. In some aspects, performing de-rate matching based at least in part on the rate matching rule allows a UE to determine system information, included in a downlink communication, that identifies a set of resources, of the set of potential resources, that carry synchronization communications, as described below.

Additionally, or alternatively, performing de-rate matching based at least in part on the rate matching rule allows a UE to transmit an uplink communication without colliding with synchronization communications transmitted by a base station in a set of resources, as described below.

Figure 9:
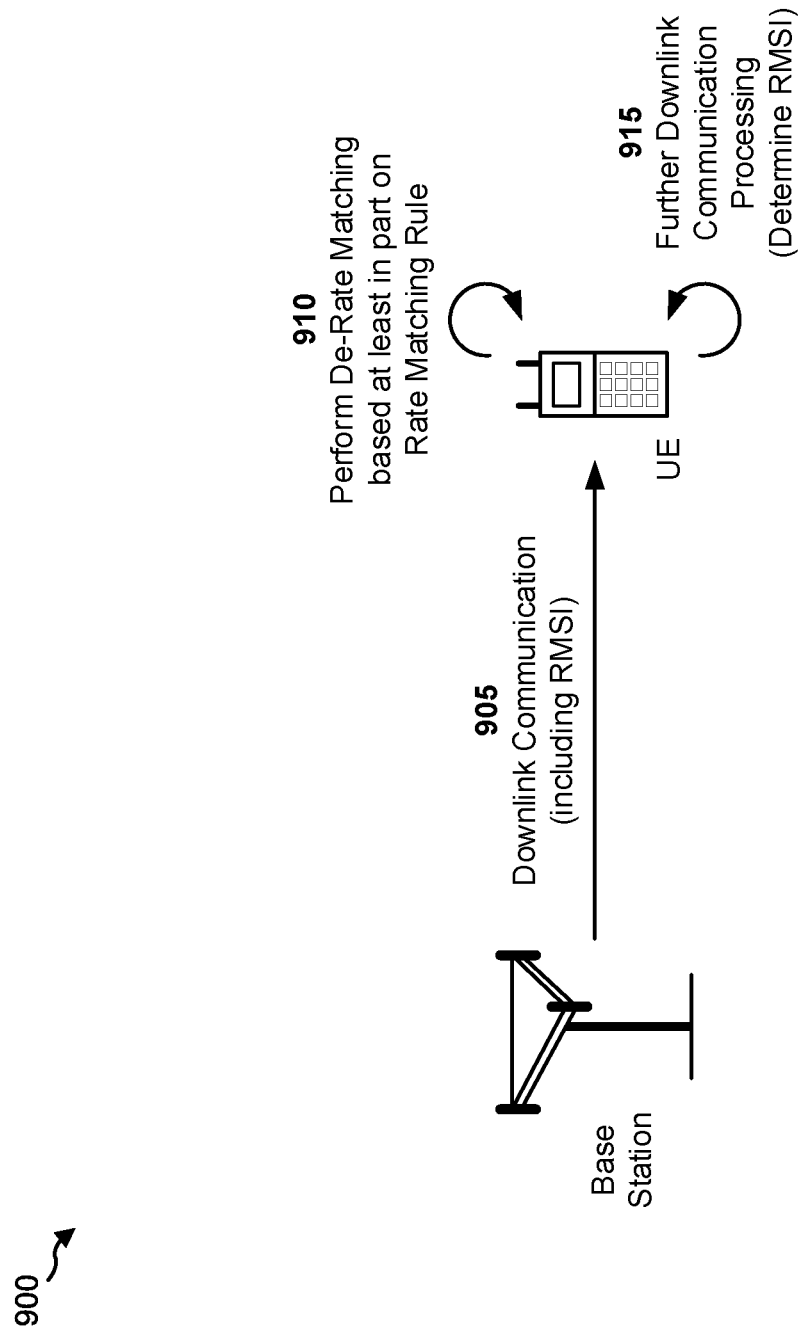
FIG. 9 is a diagram illustrating an example of performing, based at least in part on a rate matching rule associated with a set of potential resources that may carry synchronization communications, de-rate matching associated with a downlink communication, in accordance with various aspects of the present disclosure.

FIG. 9 is a diagram illustrating an example 900 of performing, based at least in part on a rate matching rule associated with a set of potential resources that may carry synchronization communications, de-rate matching associated with a downlink communication, in accordance with various aspects of the present disclosure.

For the purposes of example 900, a base station is permitted to transmit (e.g., using a mmW frequency) a number of synchronization communications (e.g., up to 64 SS blocks) in a set of potential resources such that one or more synchronization communications may be transmitted in a resource that could otherwise be used for a downlink communication (e.g., a PDCCH communication and/or a PDSCH communication). Further, the base station transmits RMSI in the downlink communication, where the RMSI includes information associated with identifying a set of resources, of the set of potential resources, that carry synchronization communications.

In some aspects, the base station may include information associated with identifying the set of resources in the system information carried in the downlink communication, may transmit the at least one synchronization communication in the set of resources, may schedule the downlink communication in resources other than the set of resources, and may rate match the downlink communication around the set of resources (e.g., in accordance with the information that identifies the set of resources). Then, the base station may be configured not to transmit the downlink communication, including the system information, in the set of resources that carry the at least one synchronization communication (but can do so in other resources of the set of potential resources for carrying synchronization communications).

As shown in FIG. 9, and by reference number 905, the base station may transmit the downlink communication for reception by a UE. In some aspects, the downlink communication may include a communication associated with the PDCCH and/or the PDSCH, as indicated above. As shown, the downlink communication may include the system information (e.g., RMSI, SIB1, MIB, and/or the like). In some aspects, the base station may transmit the communication in resources other than a set of resources, of a set of potential resources, in which the base transmits at least one synchronization communication (e.g., one or more SSBs), as described above.

In some aspects, the downlink communication may be transmitted in a mini-slot (e.g., a slot that is shorter than a standard NR slot, such as a slot with a length of 4 symbols, 2 symbols, and/or the like). As indicated in FIG. 9, the UE may receive the downlink communication.

As shown by reference number 910, based at least in part on receiving the downlink communication, the UE may perform de-rate matching based at least in part on a rate matching rule associated with the set of potential resources that may carry synchronization communications.

In some aspects, the rate matching rule may indicate that all resources, of the set of potential resources, carry synchronization communications. In other words, the rate matching rule may indicate that the UE is to assume that the base station has transmitted synchronization communications that collide with the downlink communication. In such a case, the UE may perform de-rate matching by de-rate matching around all resources included in the set of potential resources. Here, since the de-rate matching is performed around the set of potential resources, symbols carried in the set of potential resources are not interpreted when decoding the system information.

In some aspects, such a rate matching rule may increase network resource utilization since, for example, synchronization communications may be multiplexed with the downlink communication. Further, such a rate matching rule may reduce delay associated with transmitting the downlink communication since, for example, the base station need not schedule the downlink communication such that the downlink communication does not collide with the synchronization communications.

In some aspects, the rate matching rule may indicate that no resources, of the set of potential resources, carry synchronization communications. In other words, the rate matching rule may indicate that the UE is to assume that the base station has scheduled the downlink communication such that no synchronization communications collide with the downlink communication. In such a case, the UE may perform de-rate matching without de-rate matching around any resources included in the set of potential resources (e.g., the UE may perform de-rate matching in a standard manner). Here, since the de-rate matching is not performed around the set of potential resources, symbols carried in the set of potential resources are interpreted when decoding the system information.

In some aspects, such a rate matching rule may reduce wastage of network resources since, for example, resources that could otherwise be used for transmitting the system information need not be left unused (e.g., since the UE assumes that the synchronization communications do not collide with the downlink communication). Further, such a rate matching rule may conserve UE resources (e.g., memory resources, processor resources, battery power, and/or the like) since, for example, the de-rate matching may be simplified (e.g., as compared to de-rate matching around one or more resources).

In some aspects, the rate matching rule may indicate that the set of resources is identified in control information, such as downlink control information (DCI). In other words, the rate matching rule may indicate that the UE is to determine, based at least in part on control information associated with the downlink communication, information that identifies the set of resources. Here, the control information explicitly identifies the set of particular resources. In such a case, the UE may perform de-rate matching in accordance with the control information. For example, the UE may determine, based at least in part on the control information, information that identifies the set of resources that carry synchronization communications. In such a case, the UE may perform de-rate matching for those resources identified by the control information (e.g., the UE may de-rate match around none of the set of potential resources, one or more of the set of potential resources, all of the set of potential resources, and/or the like). Here, since the de-rate matching is performed around the resources carrying the synchronization communications, symbols carrying the synchronization communications are not interpreted when decoding the system information. In some aspects, the information included in the control information may be particular to the downlink communication (e.g., the RMSI may identify a different set of particular resources than those associated with the downlink communication).

In some aspects, such a rate matching rule may provide increased flexibility associated with de-rate matching, thereby allowing one or more of the advantages described above to be achieved (e.g., increased network resource utilization, reduced delay associated with transmitting the downlink communication, reduced wastage of network resources, conservation of UE resources, and/or the like).

As further shown in FIG. 9, and by reference number 915, the UE may perform further downlink communication processing, including receiving the system information. In some aspects, based at least in part on determining the system information, the UE may determine the information that identifies the set of resources (e.g., such that the UE may process further downlink communications based at least in part on the information that identifies the set of particular resources).

In some aspects, the UE may receive (e.g., at a later time) control information (e.g., DCI), associated with a second downlink communication (e.g., a paging communication, a random access response (RAR) message, and/or the like), that overrides the system information associated with the first downlink communication. For example, the control information, included in the second downlink communication, may include information that identifies a second set of resources (e.g., a different set of particular resources, of the set of potential resources, than the first set of particular resources associated with the first downlink communication) that carries synchronization communications. Here, the UE may determine information included in the second communication based at least in part on de-rate matching performed in accordance with the information that identifies the second set of resources (e.g., rather than the first set of particular resources). In some aspects, the override may be a temporary override (e.g., such that only the second downlink communication is processed based at least in part on the second set of resources) or may be a permanent override (e.g., such that future downlink communications are processed based at least in part on the second set of resources).

As indicated above, FIG. 9 is provided as an example. Other examples are possible and may differ from what was described with respect to FIG. 9.

Figure 10:
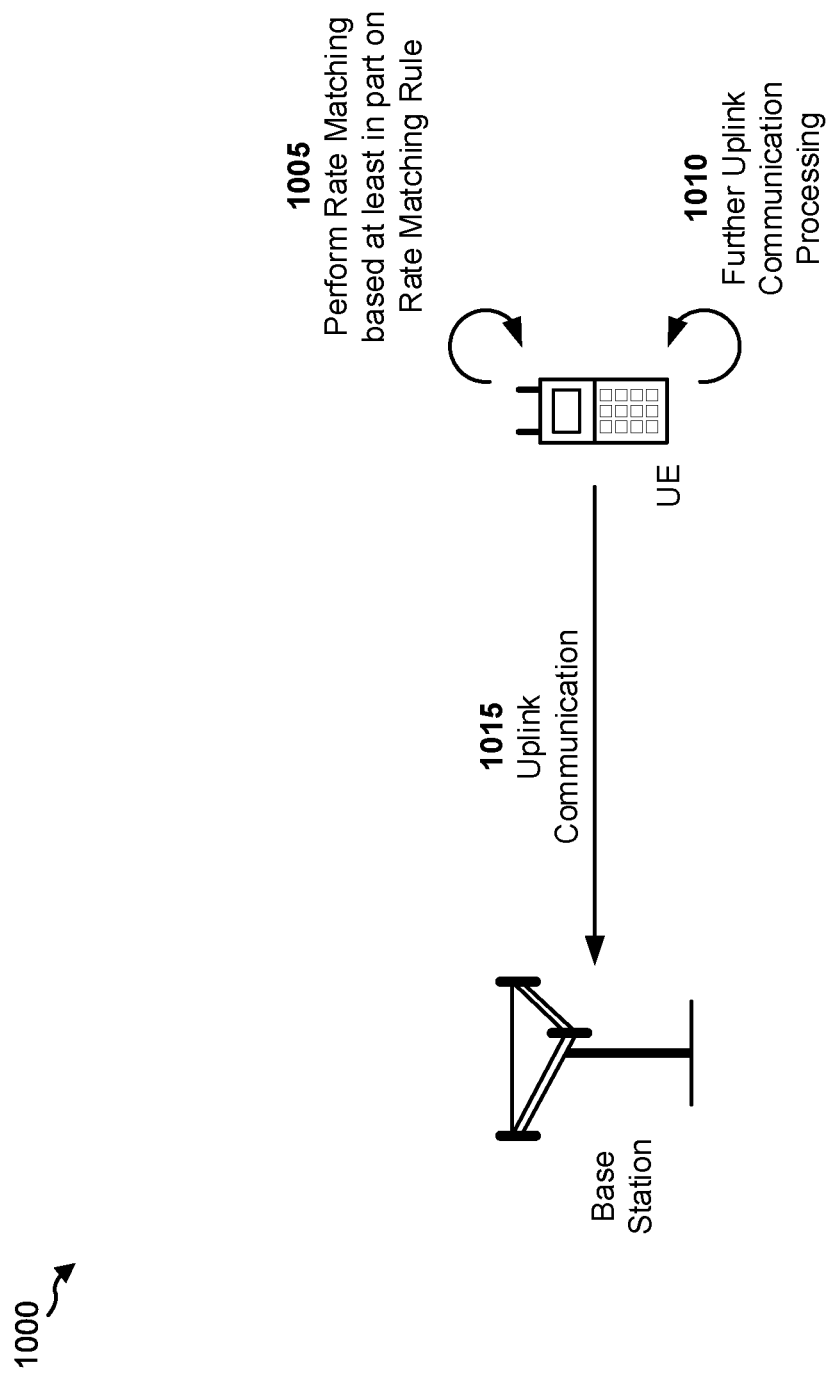
FIG. 10 is a diagram illustrating an example of performing, based at least in part on a rate matching rule associated with a set of potential resources that may carry synchronization communications, rate matching associated with an uplink communication, in accordance with various aspects of the present disclosure.

FIG. 10 is a diagram illustrating an example 1000 of performing, based at least in part on a rate matching rule associated with a set of potential resources that may carry synchronization communications, rate matching associated with an uplink communication, in accordance with various aspects of the present disclosure.

For the purposes of example 1000, a base station is permitted to transmit (e.g., using a mmW frequency) a number of synchronization communications (e.g., up to 64 SS blocks) in a set of potential resources such that one or more synchronization communications may be transmitted in a resource that could otherwise be used for an uplink communication (e.g., a PUSCH communication) by a UE. Further, a UE is configured with information that identifies the set of potential resources and is to transmit an uplink communication.

As shown by reference number 1005, the UE may perform rate matching based at least in part on a rate matching rule associated with the set of potential resources that may carry synchronization communications.

In some aspects, the rate matching rule may indicate that no resources, of the set of potential resources, carry synchronization communications. In other words, the rate matching rule may indicate that the UE is to assume that the uplink communication is scheduled (e.g., automatically, by the base station, grant-free, and/or the like) such that no synchronization communications will collide with the uplink communication. In such a case, the UE may perform rate matching without rate matching around any resources included in the set of potential resources (e.g., the UE may perform rate matching in a standard manner). Here, since the rate matching is not performed around the set of potential resources, symbols carried in the set of potential resources are used to transmit the uplink communication. In some aspects, such a rate matching rule may reduce wastage of network resources and/or may conserve UE resources, as described above.

In some aspects, the rate matching rule may indicate that all resources, of the set of potential resources, carry synchronization communications. In other words, the rate matching rule may indicate that the UE is to assume that the base station has transmitted synchronization communications that will collide with the uplink communication. In such a case, the UE may perform rate matching by rate matching around all resources included in the set of potential resources. Here, since the rate matching is performed around the set of potential resources, symbols carried in the set of potential resources are used to transmit the uplink communication. In some aspects, such a rate matching rule may increase network resource utilization and/or reduce delay associated with transmitting the uplink communication, as described above.

In some aspects, when the UE rate matches around the set of potential resources, the UE may also rate match around a set of symbols around the set of potential resources. For example, the UE may rate match around one or more symbols adjacent to those associated with the set of potential resources. In this way, the UE may provide protection for switching between uplink and downlink communications.

As shown by reference numbers 1010 and 1015, the UE may perform further uplink communication processing, associated with transmitting the uplink communication, and may transmit the uplink communication to the base station. In an aspect in which the UE does not rate match around the set of potential resources, the UE may transmit the uplink communication in one or more of the set of potential resources. Conversely, in an aspect in which the UE rate matches around the set of potential resources, the UE may not transmit the uplink communication in any of the set of potential resources.

As indicated above, FIG. 10 is provided as an example. Other examples are possible and may differ from what was described with respect to FIG. 10.

Figure 11:
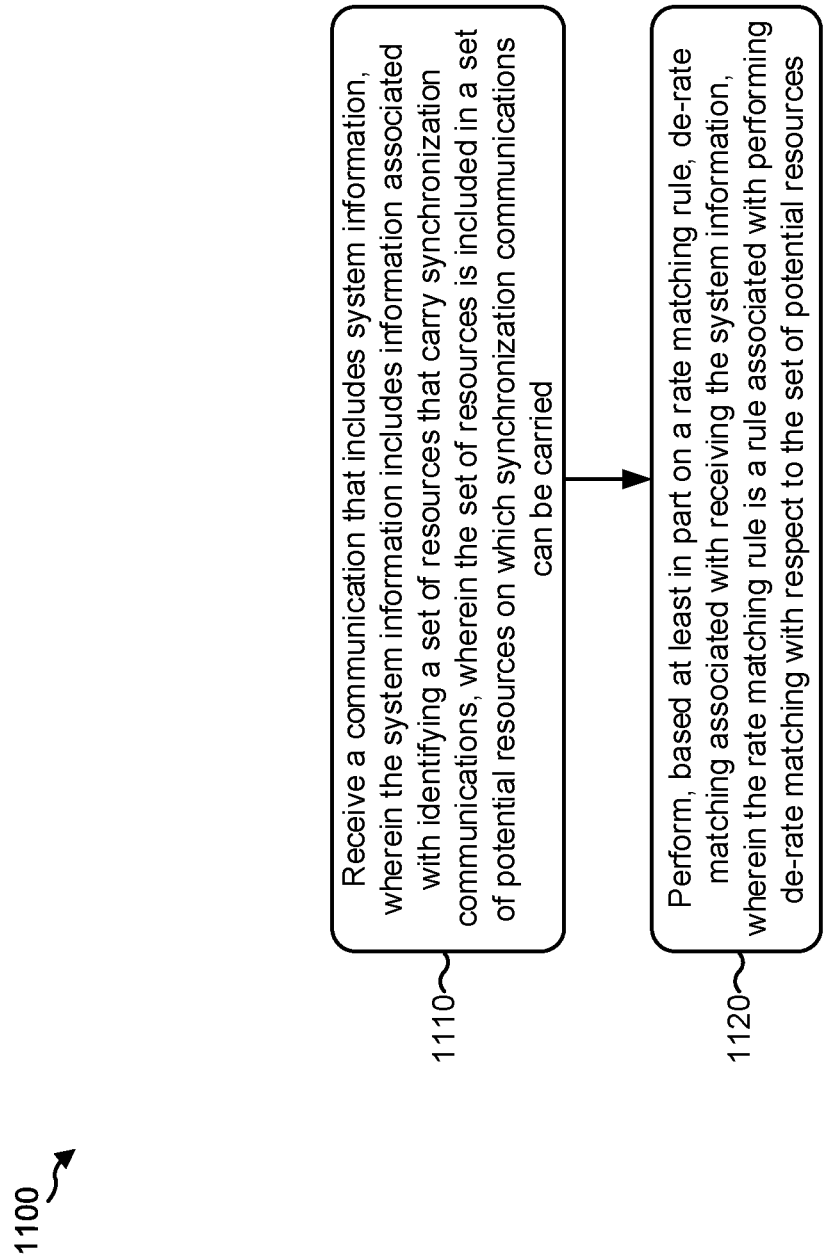
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. The UE may correspond, for example, to UE 120.

As shown in FIG. 11, in some aspects, process 1100 may include receiving a communication that includes system information, wherein the system information includes information associated with identifying a set of resources that carry synchronization communications, wherein the set of resources is included in a set of potential resources on which synchronization communications can be carried (block 1110). For example, the UE may receive a communication that includes system information, wherein the system information includes information associated with identifying a set of resources that carry synchronization communications, wherein the set of resources is included in a set of potential resources on which synchronization communications can be carried, as described above.

As further shown in FIG. 11, in some aspects, process 1100 may include performing, based at least in part on a rate matching rule, de-rate matching associated with receiving the system information, wherein the rate matching rule is a rule associated with performing de-rate matching with respect to the set of potential resources (block 1120). For example, the UE may perform, based at least in part on a rate matching rule, de-rate matching associated with receiving the system information, wherein the rate matching rule is a rule associated with performing de-rate matching with respect to the set of potential resource, as described above.

In some aspects, the rate matching rule indicates that all resources, of the set of potential resources, carry synchronization communications, and the de-rate matching is performed based at least in part on de-rate matching around all resources of the set of potential resources.

In some aspects, the rate matching rule indicates no resources, of the set of potential resources, carry synchronization communications, and the de-rate matching is performed without de-rate matching around any resources of the set of potential resources.

In some aspects, the rate matching rule indicates that the set of resources is identified in control information, and the de-rate matching is performed based at least in part on de-rate matching in accordance with the control information.

In some aspects, the control information is downlink control information (DCI).

In some aspects, the system information is remaining minimum system information (RMSI), system information block 1 (SIB1), or minimum system information (MSI).

In some aspects, the synchronization communications include at least one synchronization signal (SS) block.

In some aspects, the communication is associated with a physical downlink control channel (PDCCH).

In some aspects, the communication is associated with a physical downlink shared channel (PDSCH).

In some aspects, the set of potential resources includes resources associated with carrying 64 synchronization communications.

In some aspects, the communication is associated with a millimeter wave (mmW) frequency.

In some aspects, the system information is received based at least in part on performing the de-rate matching.

In some aspects, the communication is a first communication and the set of resources is a first set of resources, and the UE may: receive a second communication including control information, wherein the control information includes information that identifies a second set of resources that carries synchronization communications, wherein the information that identifies the second set of resources overrides information that identifies the first set of resources, wherein the information that identifies the first set of resources is determined based at least in part on the system information; and determine information included in the second communication based at least in part on the information that identifies the second set of resources.

In some aspects, the second communication is a paging communication.

In some aspects, the second communication is a random access response.

In some aspects, the communication is communicated in a mini-slot.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
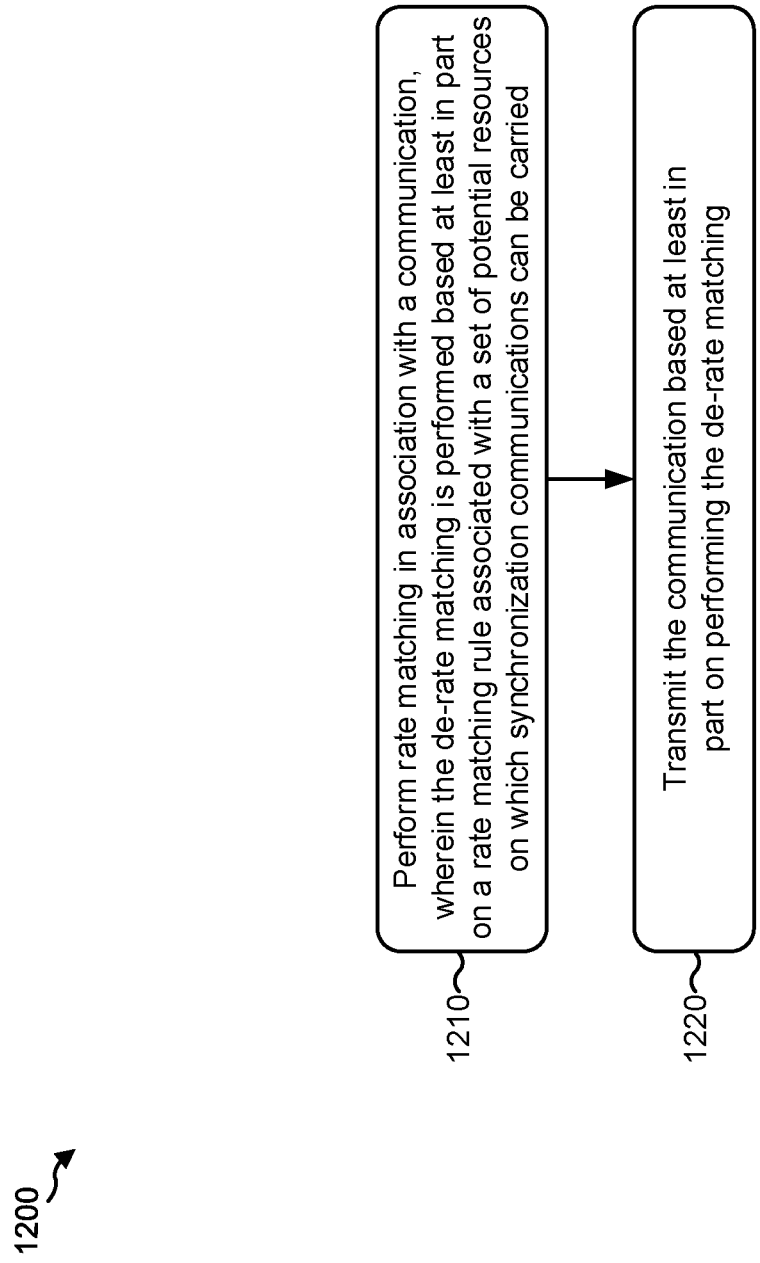
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. The UE may correspond, for example, to UE 120.

As shown in FIG. 12, in some aspects, process 1200 may include performing rate matching in association with a communication, wherein the rate matching is performed based at least in part on a rate matching rule associated with a set of potential resources on which synchronization communication can be carried (block 1210). For example, the UE may perform rate matching in association with a communication, wherein the rate matching is performed based at least in part on a rate matching rule associated with a set of potential resources on which synchronization communications can be carried, as described above.

As further shown in FIG. 12, in some aspects, process 1200 may include transmitting the communication based at least in part on performing the rate matching (block 1220). For example, the UE may transmit the communication based at least in part on performing the rate matching, as described above.

In some aspects, the rate matching rule indicates no resources, of the set of potential resources, carry synchronization communications, and the rate matching is performed without rate matching around any resources of the set of potential resources.

In some aspects, the rate matching rule indicates that all resources, of the set of potential resources, carry synchronization communications, and the rate matching is performed based at least in part on rate matching around all resources of the set of potential resources.

In some aspects, the rate matching is performed further based at least in part on rate matching around a set of symbols around the set of potential resources.

In some aspects, the synchronization communications include at least one synchronization signal (SS) block.

In some aspects, the set of potential resources includes resources associated with carrying 64 synchronization communications.

In some aspects, the communication is associated with a millimeter wave (mmW) frequency.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
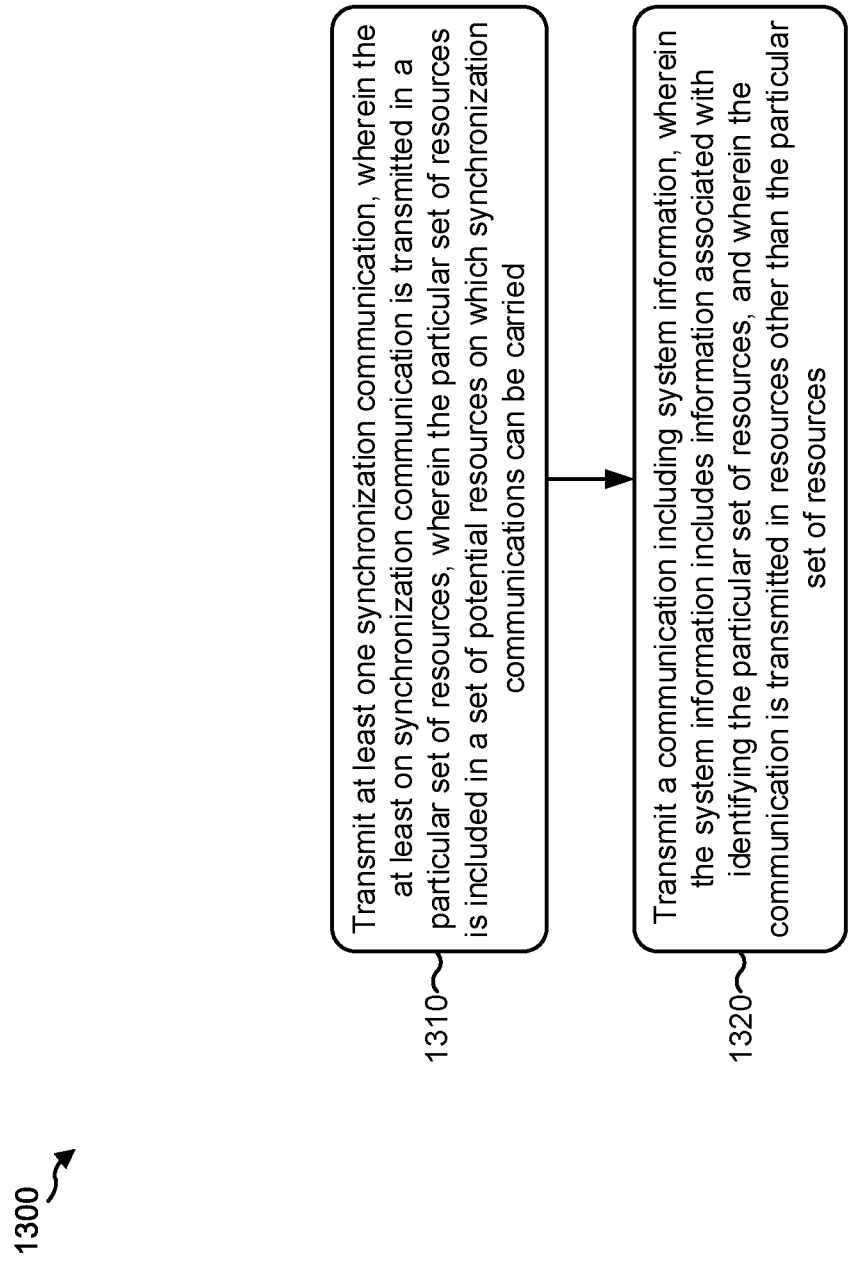
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. The base station may correspond, for example, to base station 110.

As shown in FIG. 13, in some aspects, process 1300 may include transmitting at least one synchronization communication, wherein the at least on synchronization communication is transmitted in a set of resources, wherein the set of resources is included in a set of potential resources on which synchronization communications can be carried (block 1310). For example, the base station may transmit at least one synchronization communication, wherein the at least on synchronization communication is transmitted in a set of resources, wherein the set of resources is included in a set of potential resources on which synchronization communications can be carried, as described above.

As further shown in FIG. 13, in some aspects, process 1300 may include transmitting a communication including system information, wherein the system information includes information associated with identifying the set of resources, and wherein the communication is transmitted in resources other than the set of resources (block 1320). For example, the base station may transmit a communication including system information, wherein the system information includes information associated with identifying the set of resources, and wherein the communication is transmitted in resources other than the set of resources, as described above.

In some aspects, the system information is remaining minimum system information (RMSI), system information block 1 (SIB1), or minimum system information (MSI).

In some aspects, the synchronization communications include at least one synchronization signal (SS) block.

In some aspects, the communication is associated with a physical downlink shared channel (PDSCH).

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
    receiving, by a user equipment (UE), a communication that includes system information,
        wherein the system information includes information associated with identifying a set of resources that carry synchronization communications,
        wherein the set of resources is included in a set of potential resources on which synchronization communications can be carried, and
        wherein the set of resources is a first set of resources;
    performing, by the UE and based at least in part on a rate matching rule, de-rate matching associated with receiving the system information,
        wherein the rate matching rule is a rule associated with performing de-rate matching with respect to the set of potential resources; and
    receiving, by the UE, information that identifies a second set of resources that carries synchronization communications,
        wherein the information that identifies the second set of resources temporarily overrides information that identifies the first set of resources.

2. The method of claim 1, wherein the rate matching rule indicates that all resources, of the set of potential resources, carry synchronization communications, and
    wherein the de-rate matching is performed based at least in part on de-rate matching around all resources of the set of potential resources.

3. The method of claim 1, wherein the rate matching rule indicates no resources, of the set of potential resources, carry synchronization communications, and
    wherein the de-rate matching is performed without de-rate matching around any resources of the set of potential resources.

4. The method of claim 1, wherein the rate matching rule indicates that the set of resources is identified in control information, and
    wherein the de-rate matching is performed based at least in part on de-rate matching in accordance with the control information.

5. The method of claim 4, wherein the control information is downlink control information (DCI).

6. The method of claim 1, wherein the system information is remaining minimum system information (RMSI), system information block 1 (SIB1), or minimum system information (MSI).

7. The method of claim 1, wherein the synchronization communications include at least one synchronization signal (SS) block.

8. The method of claim 1, wherein the communication is associated with a physical downlink control channel (PDCCH).

9. The method of claim 1, wherein the communication is associated with a physical downlink shared channel (PDSCH).

10. The method of claim 1, wherein the set of potential resources includes resources associated with carrying 64 synchronization communications.

11. The method of claim 1, wherein the communication is associated with a millimeter wave (mmW) frequency.

12. The method of claim 1, wherein the system information is received based at least in part on performing the de-rate matching.

13. The method of claim 1,
    wherein the communication is a first communication,
    wherein receiving the information that identifies the second set of resources comprises:
        receiving a second communication including control information,
            wherein the control information includes the information that identifies the second set of resources,
            wherein the information that identifies the first set of resources is determined based at least in part on the system informational, and
    wherein the method further comprises:
        determining information included in the second communication based at least in part on the information that identifies the second set of resources.

14. The method of claim 13, wherein the second communication is a paging communication.

15. The method of claim 13, wherein the second communication is a random access response.

16. The method of claim 13, wherein the control information is downlink control information (DCI).

17. The method of claim 1, wherein the communication is communicated in a mini-slot.

18. A device for wireless communication, comprising:
    a memory; and
    one or more processors operatively coupled to the memory, the memory and the one or more processors configured to:
        receive a communication that includes system information, wherein the system information includes information associated with identifying a set of resources that carry synchronization communications,
wherein the set of resources is included in a set of potential resources on which synchronization communications can be carried, and
wherein the set of resources is a first set of resources;
perform, based at least in part on a rate matching rule, de-rate matching associated with receiving the system information,
wherein the rate matching rule is a rule associated with performing de-rate matching with respect to the set of potential resources; and
receive information that identifies a second set of resources that carries synchronization communications,
wherein the information that identifies the second set of resources temporarily overrides information that identifies the first set of resources.

19. The device of claim 18, wherein the rate matching rule indicates no resources, of the set of potential resources, carry synchronization communications, and
wherein the de-rate matching is performed without de-rate matching around any resources of the set of potential resources.

20. The device of claim 18, wherein the system information is remaining minimum system information (RMSI), system information block 1 (SIB1), or minimum system information (MSI).

21. The device of claim 18, wherein the communication is associated with a physical downlink control channel (PDCCH).

22. The device of claim 18, wherein the communication is associated with a physical downlink shared channel (PDSCH).

23. The device of claim 18, wherein the set of potential resources includes resources associated with carrying 64 synchronization communications.

24. The device of claim 18, wherein the communication is associated with a millimeter wave (mmW) frequency.

25. A method, comprising:
transmitting, by a base station, at least one synchronization communication,
wherein the at least one synchronization communication is transmitted in a set of resources,
wherein the set of resources is included in a set of potential resources on which synchronization communications can be carried, and
wherein the set of resources is a first set of resources;
transmitting, by the base station, a communication including system information,
wherein the system information includes information associated with identifying the set of resources; and
transmitting, by the base station, information that identifies a second set of resources that carries synchronization communications
wherein the information that identifies the second set of resources temporarily overrides information that identifies the first set of resources.

26. The method of claim 25, wherein the system information comprises remaining minimum system information (RMSI), system information block 1 (SIB1), or minimum system information (MSI).

27. The method of claim 25, wherein the synchronization communications include at least one synchronization signal (SS) block.

28. The method of claim 25, wherein the communication is associated with a physical downlink shared channel (PDSCH).

29. A device for wireless communication, comprising:
a memory; and
one or more processors operatively coupled to the memory, the memory and the one or more processors configured to:
transmit at least one synchronization communication,
wherein the at least on synchronization communication is transmitted in a set of resources,
wherein the set of resources is included in a set of potential resources on which synchronization communications can be carried, and
wherein the set of resources is a first set of resources;
transmit a communication including system information,
wherein the system information includes information associated with identifying the set of resources; and
transmit information that identifies a second set of resources that carries synchronization communications,
wherein the information that identifies the second set of resources temporarily overrides information that identifies the first set of resources.

30. The device of claim 29, wherein the system information is remaining minimum system information (RMSI), system information block 1 (SIB1), or minimum system information (MSI).

* * * * *